Feb. 22, 1927.

T. S. HAMILTON

ATTACHMENT FOR VEHICLE SPRINGS

Filed Dec. 7, 1925

Inventor
THOMAS S HAMILTON
By
Attorney

Feb. 22, 1927.
T. S. HAMILTON
1,618,705
ATTACHMENT FOR VEHICLE SPRINGS
Filed Dec. 7, 1925    2 Sheets-Sheet 2
Fig. 6.
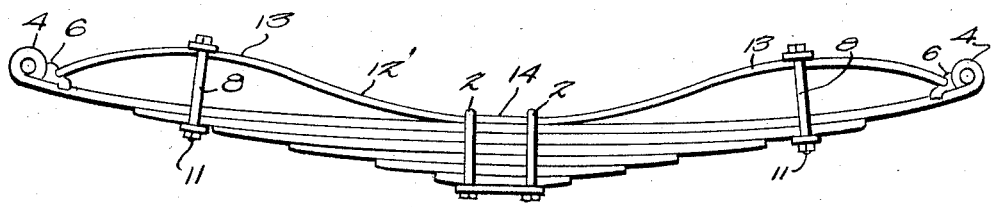
Fig. 7.
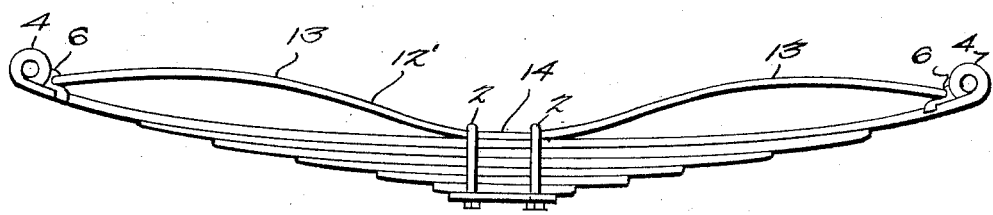
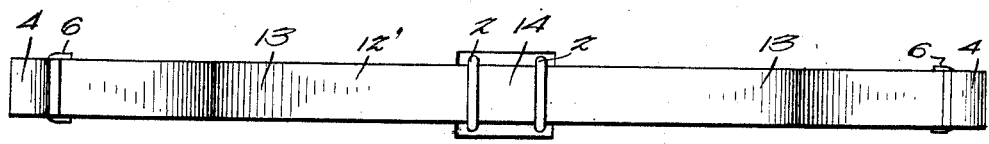
Fig. 8.
Inventor
THOMAS S. HAMILTON
By    *[signature]*
Attorney Patented Feb. 22, 1927.

1,618,705

UNITED STATES PATENT OFFICE.

THOMAS S. HAMILTON, OF LOS ANGELES, CALIFORNIA.

ATTACHMENT FOR VEHICLE SPRINGS.

Application filed December 7, 1925. Serial No. 73,711.

This invention relates to attachments for vehicle springs, and more particularly to means for eliminating the rebound caused by the original movement of the spring when passing over an uneven surface.

In most types of snubbers when in use, the snubber is attached to the vehicle body or frame and to the axle and the weight of the wheels and axle is depended upon to lessen or offset the upward throw or rebound of the spring. In the operation of these devices, if the upward force caused by the rebound is great enough to lift the body of the vehicle, the weight of the wheels and axle is not sufficient to hold the body by means of the snubber and if the spring action is sufficiently violent, the wheels are lifted off the ground.

Further objections to various types of snubbers now employed is that they must have a tight adjustment and that they cannot be kept in adjustment when the vehicle is in continuous use, and they are not fast enough in action to respond to each spring flexion.

In the spring control forming the subject matter of the present invention, I provide an arched member arranged over the spring leaf and extending from one end of the upper leaf toward the other end. I further provide means for spacing this member a constant distance from the upper leaf of the spring at a point intermediate the ends of the member whereby the upward movement of the ends of the spring, causing rebound and which tends to bow the upper spring leaf and therefore shorten the distance from each of its ends to the outer, will cause the control member to arch at a point between the clamp and its end and exert a pressure or force against the normal action of the spring during the rebound. In this manner, the wheels are held on the ground, creating or effecting greater traction and better riding qualities.

An object of the invention is the provision of a device of this character which will hold the wheels to the road and minimize side sway.

A further object of the invention is the provision of a device of this character that requires no adjustment after installation.

A further object of the invention is the provision of a device of simple construction which will function at the rate of speed at which the spring flexes and will thus offset the rebound of the spring at all times.

A still further object is the provision of a relatively inexpensive device of the character which may be quickly and easily installed.

In the accompanying drawings, I have shown several embodiments of the invention. In this showing:

Figure 4:
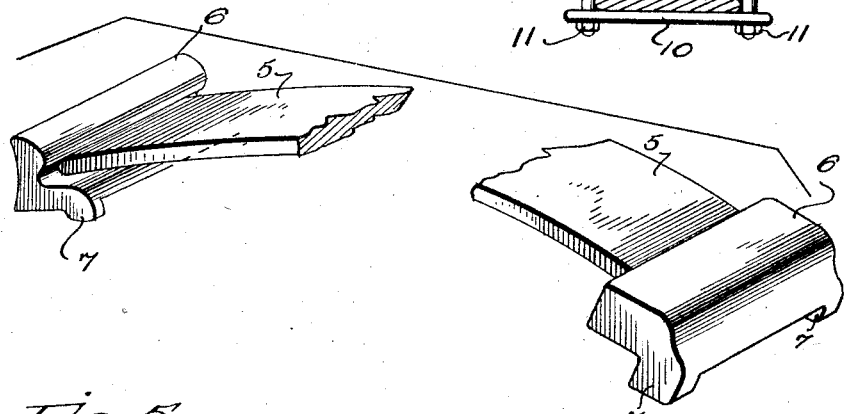
Figure 5:
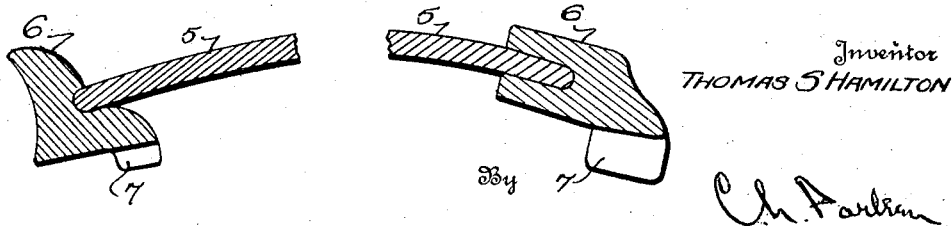

Figure 4 is a perspective view of the control removed from the vehicle showing the shoes by means of which it is attached to the vehicle spring, Figure 5 is a central longitudinal sectional view thereof, Figure 6 is a side elevation of a vehicle spring showing another form of the invention, Figure 7 is a similar view of a modified form, and, Figure 8 is a plan view of the construction shown in Figure 7.

Referring to Figures 1 to 5 of the drawings, the reference numeral 1 designates generally the leaves of a vehicle spring which are formed of progressively increasing length in the usual manner. These leaves are held together at the center by means of U-bolts 2 passing over plates 3 arranged above and below the leaves of the spring. The outer ends of the upper leaves of the spring are provided with shackle receiving eyes 4 by means of which the spring is secured to the body of the vehicle. The vehicle axle (not shown) is secured to the center of the spring in the usual manner. The parts heretofore described are of the usual construction and form no part of the present invention except in the combination claimed. In attaching the control device forming the subject matter of the present invention, I employ an arched metal blade or plate 5 which is adapted to be arranged on the spring between two fixed points, such as the edge of the plate 3 and the inner side of the eye 4. This blade may be mounted in suitable shoes 6 at each end, which shoes may be formed of bronze or other self-lubricating metal. As shown, the shoes are provided with side flanges 7 adapted to extend over the sides of the upper leaf of the spring to prevent displacement. In attaching the blade, it is clamped to the spring in such manner that the distance between the blade and the spring is retained constant at one point intermediate the ends of the blade. Any suitable clamping means may be employed for this purpose. As shown, I employ bolts 8 adapted to be passed through openings in a plate 9 arranged over the control blade and adapted to be passed through openings in a similar plate 10 arranged beneath the spring. Nuts 11 are arranged on the end of the bolt and the device may be adjusted when installed to exert a desired pressure on the center of the spring during the rebound action.

Figure 1:
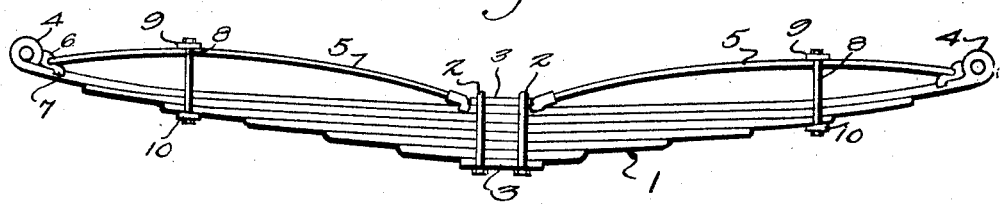
Figure 1 is a side elevation of a vehicle spring showing one form of the invention applied.
Figure 2:
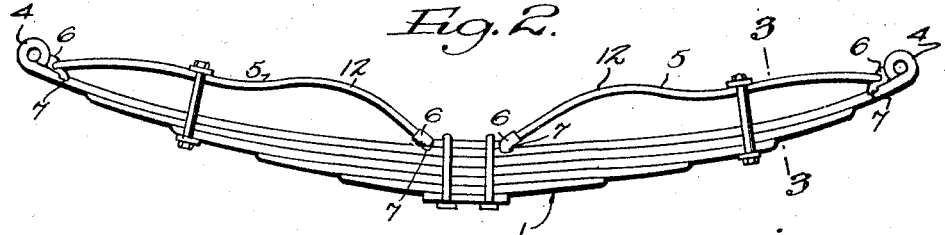
Figure 2 is a side elevation of the spring during rebound showing the position of the control, the view being exaggerated to more clearly set forth the action of the control, Figure 3:
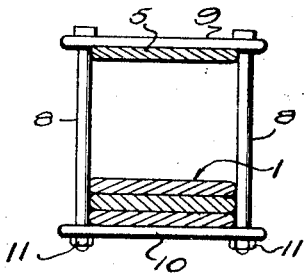
Figure 3 is a vertical sectional view on line 3—3 of Figure 2.

In Figure 2 of the drawings, I have shown the position of the control member 5 during rebound. When the spring recoils, or rebounds past its normal position, the distance between the edge of the plate 3 and the eye 4 decreases. This tends to further arch the control member 5 but as the control member is retained a fixed distance from the spring at the point where the clamp is attached, the arching occurs between the clamp and the end of the control member, as indicated at 12, in Figure 2 of the drawings. This arching causes the control member to exert a force against the rebound movement of the spring and instead of tending to lift the wheels of the vehicle from the ground, as in the usual type of snubber, the force being directly opposite to the movement of the spring, causes the wheel to maintain traction with the ground at all times.

In Figures 6 to 8 of the drawings, I have shown the attachment in the form of a plate 12′ adapted to extend throughout the length of the spring. As shown, the shoes 6 are arranged adjacent the eyes 4 in the manner heretofore described and one end of the blade is arranged in each of the shoes. Adjacent each end, the blade is arched, as at 13, and a clamp of the type heretofore described is secured to the arched portion thereof. The intermediate portion 14 of the plate is arranged immediately over the upper leaf of the spring and retained in such position by the U-bolts 2. The construction shown in Figures 7 and 8 is the same as in Figure 6, except that the clamps are eliminated.

The operation of the device is substantially the same as in the form shown in Figures 1 to 5 of the drawings. When the distance between each end of the spring and the center clip tends to shorten the movement is counteracted by the tendency of the attachment to arch which exerts an under pressure against the eyes in the opposite direction.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

1. An attachment for vehicle springs comprising a member adapted to be arranged over the upper leaf of a spring with its ends in engagement with said spring at two spaced points, and its intermediate portion spaced therefrom, shoes arranged on the ends of said member and contacting with the upper leaf of the spring, and means for maintaining one portion of said member a fixed distance from the upper leaf of the spring.

2. An attachment for vehicle springs comprising a member adapted to be arranged over the upper leaf of a spring with its ends in engagement with said spring at two spaced points and its intermediate portion spaced therefrom, shoes arranged on the ends of said member and contacting with the upper leaf of the spring, and a clamping element surrounding said member and said spring at an intermediate point whereby said portion of said member is maintained a fixed distance from the spring.

3. An attachment for vehicle springs comprising a member adapted to be arranged over the upper leaf of a spring with its ends abutting the center clip and the end eye of the spring, and an intermediate portion spaced from the upper spring leaf, and means for maintaining one portion of said member a fixed distance from the upper leaf of the spring.

4. An attachment for vehicle springs comprising a member adapted to be arranged over the upper leaf of a spring with its ends abutting the center clip and the end eye of the spring and its intermediate portion spaced from the upper spring leaf, and a clamping element surrounding said member and said spring at an intermediate point to maintain such portion a fixed distance from the upper leaf of the spring.

5. The combination with a vehicle spring for connection between the body and axle of the vehicle, of an attachment therefor for eliminating rebound comprising a thrust member arranged over the upper leaf of the vehicle spring with one end abutting one of the spring eyes and with an intermediate portion spaced from the upper spring leaf whereby shortening of the spring during rebound causes said member to exert a counterforce.

6. The combination with a vehicle leaf spring having points of connection with the body and axle of the vehicle and adapted to be deflected upon relative movement therebetween, of an attachment for the spring comprising a member having spaced portions arranged adjacent portions of the spring and fixed against relative movement therewith, said member being adapted to resist movement of said portions thereof toward each other when said spring is deflected due to movement of the body and axle of the vehicle away from each other.

7. The combination with a vehicle leaf spring having points of connection between the body and axle of the vehicle and adapted to be deflected upon relative movement therebetween, of an attachment for the vehicle spring comprising a spring member having spaced portions arranged adjacent portions of the vehicle spring and fixed against relative movement with respect thereto, said member having an intermediate portion spaced from the vehicle spring and adapted to resist movement of said spaced portions of said member toward each other upon deflection of the vehicle spring due to movement of the body and axle of the vehicle away from each other.

In testimony whereof, I affix my signature.

THOMAS S. HAMILTON.